(12) United States Patent
Hwang et al.

(10) Patent No.: US 7,324,609 B1
(45) Date of Patent: Jan. 29, 2008

(54) DC OFFSET CANCELLATION IN A DIRECT CONVERSION RECEIVER CONFIGURED FOR RECEIVING AN OFDM SIGNAL

(75) Inventors: Chien-Meen Hwang, San Jose, CA (US); Harish Kutagulla, Austin, TX (US); Xu Zhou, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 765 days.

(21) Appl. No.: 10/700,474

(22) Filed: Nov. 5, 2003

(51) Int. Cl.
  *H04L 25/06* (2006.01)
(52) U.S. Cl. .................. 375/319; 375/343; 375/344
(58) Field of Classification Search ................ 375/319, 375/344
  See application file for complete search history.

(56) References Cited

U.S. PATENT DOCUMENTS

| | | | |
|---|---|---|---|
| 6,757,344 B2* | 6/2004 | Carleton ..................... | 375/341 |
| 6,816,555 B2* | 11/2004 | Sakoda ....................... | 375/260 |
| 6,961,393 B1* | 11/2005 | Cupo et al. ................. | 375/343 |
| 7,010,559 B2* | 3/2006 | Rawlins et al. ............. | 708/425 |
| 7,103,090 B2* | 9/2006 | Chang et al. ............... | 375/145 |
| 7,151,759 B1* | 12/2006 | Ryan et al. ................. | 370/332 |
| 2002/0065047 A1* | 5/2002 | Moose ........................ | 455/63 |
| 2002/0097812 A1* | 7/2002 | Wiss .......................... | 375/316 |
| 2003/0128776 A1* | 7/2003 | Rawlins et al. ............. | 375/319 |
| 2004/0002308 A1* | 1/2004 | Eberle ....................... | 455/127.2 |
| 2004/0203472 A1* | 10/2004 | Chien ........................ | 455/68 |
| 2004/0219884 A1* | 11/2004 | Mo et al. .................... | 455/67.11 |
| 2004/0228424 A1* | 11/2004 | Baldwin et al. ............ | 375/343 |
| 2005/0025041 A1* | 2/2005 | Marsili ....................... | 370/208 |
| 2005/0058227 A1* | 3/2005 | Birkett et al. ............... | 375/329 |
| 2005/0111525 A1* | 5/2005 | Driesen et al. ............. | 375/147 |

OTHER PUBLICATIONS

Heiskala "OFDM wireless LANs: A theoretical and practical guide", SAMS 2002 pp. 66-73.*
Moose, "A technique for orthogonal frequency division multiplexing frequency offset correction", IEEE Transactions on Communications, vol. 42, Issue 10, Oct. 1994 pp. 2908-2914.*
Miaoudakis, "Carrier frequency offset estimation and correction for Hiperlan/2 WLANs", Proceedings, ISCC 2002, Seventh International Symposium on Computers and Communications, 2002. Jul. 1-4, 2002 pp. 693-698.*
Jian Li, "Carrier frequency offset estimation for OFDM-based WLANs", IEEE Signal Processing Letters, vol. 8, Issue 3, Mar. 2001 pp. 80-82.*
IEEE Std. 802.11a-1999, "Part 11: Wireless LAN Medium Access Control (MAC) and Physical Layer (PHY) specifications: High-speed Physical Layer in the 5 GHZ Band", LAN/MAN Standards Committee of the IEEE Computer Society, IEEE-SA Standards Board, Approved Sep. 16, 1999, New York, USA.

* cited by examiner

*Primary Examiner*—Mohammed Ghayour
*Assistant Examiner*—Juan Alberto Torres
(74) *Attorney, Agent, or Firm*—Manelli Denison & Selter PLLC; Leon R. Turkevich

(57) ABSTRACT

An OFDM receiver has a DC offset estimator configured for determining a DC offset, in I and Q components of a received OFDM signal having been output by an analog front end, based on filtering prescribed subcarrier components from a preamble segment of the I and Q components. The OFDM receiver removes the determined DC offset from the I and Q components, resulting in respective corrected I and Q components having minimal DC offset.

12 Claims, 4 Drawing Sheets

DC OFFSET CANCELLATION IN A DIRECT CONVERSION RECEIVER CONFIGURED FOR RECEIVING AN OFDM SIGNAL

BACKGROUND OF THE INVENTION

1. Field of the Invention

The present invention relates to estimation of DC offset and cancellation thereof in wireless direction conversion receivers, for example an IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11a based OFDM PHY in hardware involves providing a cost-effective, compact device the can be implemented in smaller wireless devices. Hence, implementation concerns typically involve cost, device size, and device complexity.

FIG. 1 is a diagram of a typical direct conversion receiver. The direct conversion receiver 10 includes an antenna 12, a low noise amplifier 14, a local oscillator 16 tuned to a prescribed carrier frequency, mixers 18a and 18b, and lowpass channel filters 20a and 20b. As recognized in the art, I and Q channel signals are generated based on modulating a signal by a first carrier and a second carrier phase-shifted by $\pi/2$ (i.e., 90 degrees), respectively. The received signal is supplied to the mixers 18a and 18b. The mixer 18a outputs a first demodulated signal that includes the I component and a first carrier component (e.g., a sine wave); the mixer 18b, having received a phase-shifted carrier signal from the phase shifter 22, outputs a second demodulated signal that includes the Q component and a second carrier component (e.g., a cosine wave). The low pass filters 20a and 20b remove the respective carrier components and output the I and Q components, respectively.

A particular concern involves minimizing errors encountered during implementation of the direct conversion receiver architecture in hardware. A DC offset is induced by the analog front end 10 of FIG. 1 due to the amplifier 14. The induced DC offset creates intercarrier interference in the OFDM signal, which may affect the ability of the OFDM receiver to decode the packet.

SUMMARY OF THE INVENTION

There is a need for an arrangement that enables a direct conversion receiver to accurately estimate induced DC offset during reception of an OFDM signal in order to accurately cancel the effects of DC offset from the received OFDM signal.

These and other needs are attained by the present invention, where an OFDM receiver has a DC offset estimator configured for determining a DC offset, in first and second components of a received OFDM signal having been output by an analog front end, based on filtering prescribed subcarrier components from a preamble segment of the first and second components. The OFDM receiver removes the determined DC offset from the first and second components, resulting in respective corrected first and second OFDM components having minimal DC offset.

One aspect of the present invention provides a method in an OFDM direct conversion receiver configured for receiving a wireless signal. The method includes recovering first and second components from the wireless signal by mixing the wireless signal with first and second carrier frequency signals, respectively, the second carrier frequency signal phase-shifted by a prescribed amount relative to the first carrier frequency signal. The method also includes filtering prescribed subcarrier components from a prescribed preamble portion of each of the first and second components to obtain first and second DC offset components, respectively. The method also includes outputting corrected first and second components based on removing the first and second DC offset components from the first and second components, respectively.

Another aspect of the present invention provides an OFDM direct conversion receiver configured for receiving a wireless signal carrying data. The receiver includes an analog front end configured for recovering first and second components from the wireless signal by mixing the wireless signal with first and second carrier frequency signals, respectively, the second carrier frequency signal phase-shifted by a prescribed amount relative to the first carrier frequency signal. The receiver also includes a DC offset estimator, and a compensator. The DC offset estimator is configured for determining first and second DC offset components based on filtering prescribed subcarrier components from a prescribed preamble portion of each of the first and second components, respectively. The compensator is configured for outputting corrected first and second components of the wireless signal, for recovery of the data, based on removing the first and second DC offset components from the first and second components, respectively.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11a OFDM transceiver, followed by a detailed description of the I/Q compensation module implemented according to an embodiment of the present invention.

Receiver Architecture Overview

Figure 2:
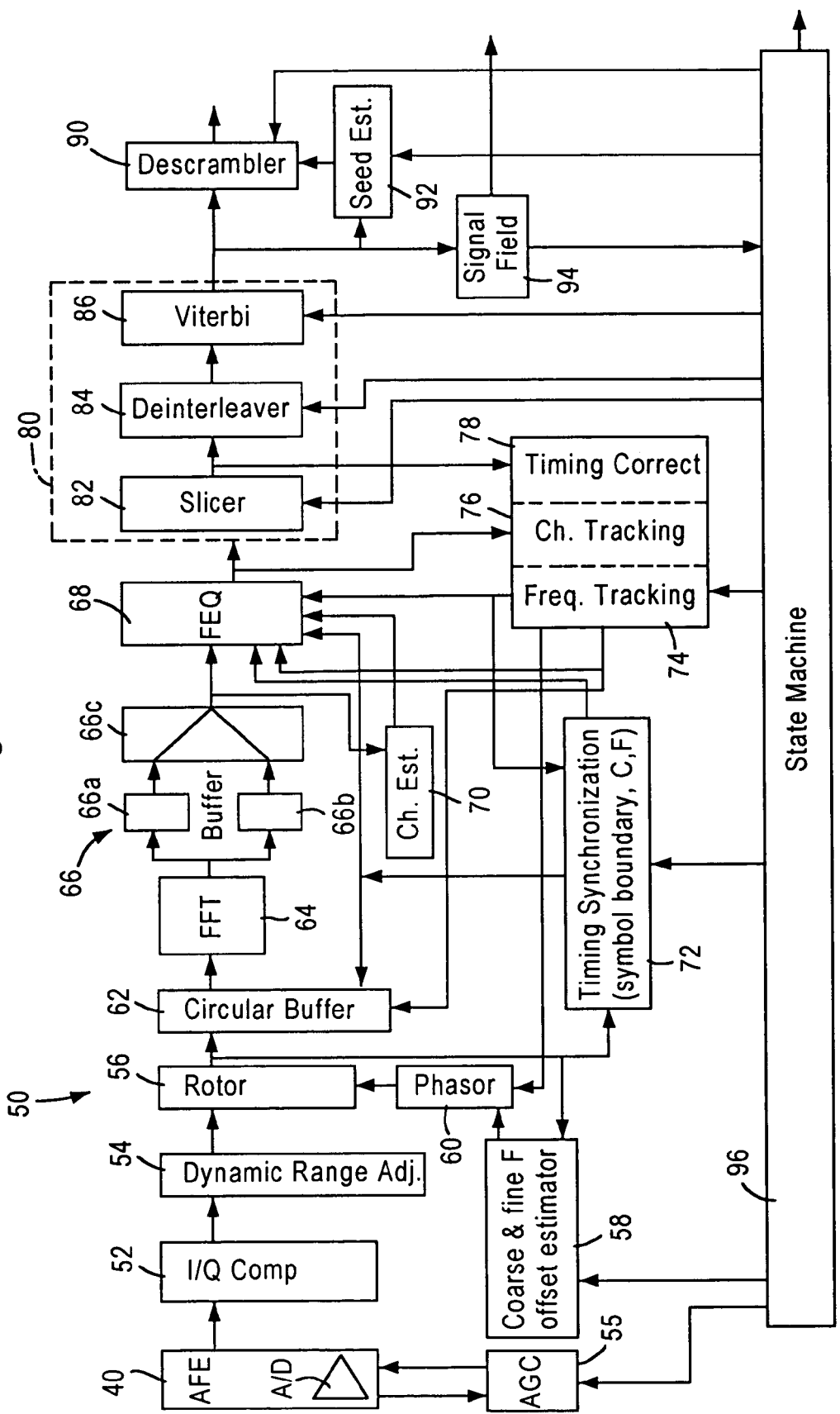
FIG. 2 is a diagram illustrating the receiver portion of an IEEE 802.11a OFDM transceiver according to an embodiment of the present invention.

FIG. 2 is a diagram illustrating an architecture of a receiver module 50 of an IEEE 802.11a Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module 52 is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11a preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11a specification.

The descrambler circuit 90 is configured for recovering the original serial bit stream from the decoded data, by descrambling a 127-bit sequence generated by the scrambler of the transmitter, according to the IEEE 802.11a specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11a compliant Media Access Controller (MAC).

DC Offset Estimation and Cancellation

Figure 1:
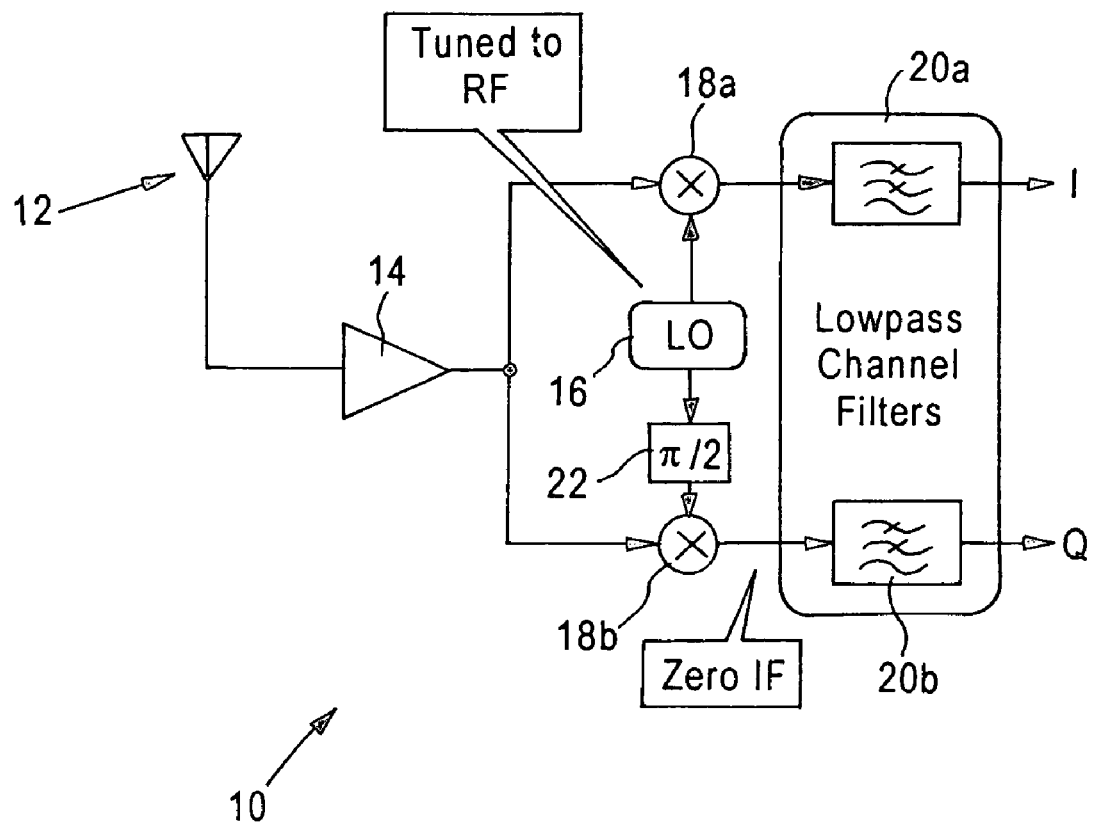
FIG. 1 is a diagram illustrating a conventional (PRIOR ART) direct conversion receiver configured for recovering I and Q components from a received IEEE 802.11a OFDM wireless signal.
Figure 3:
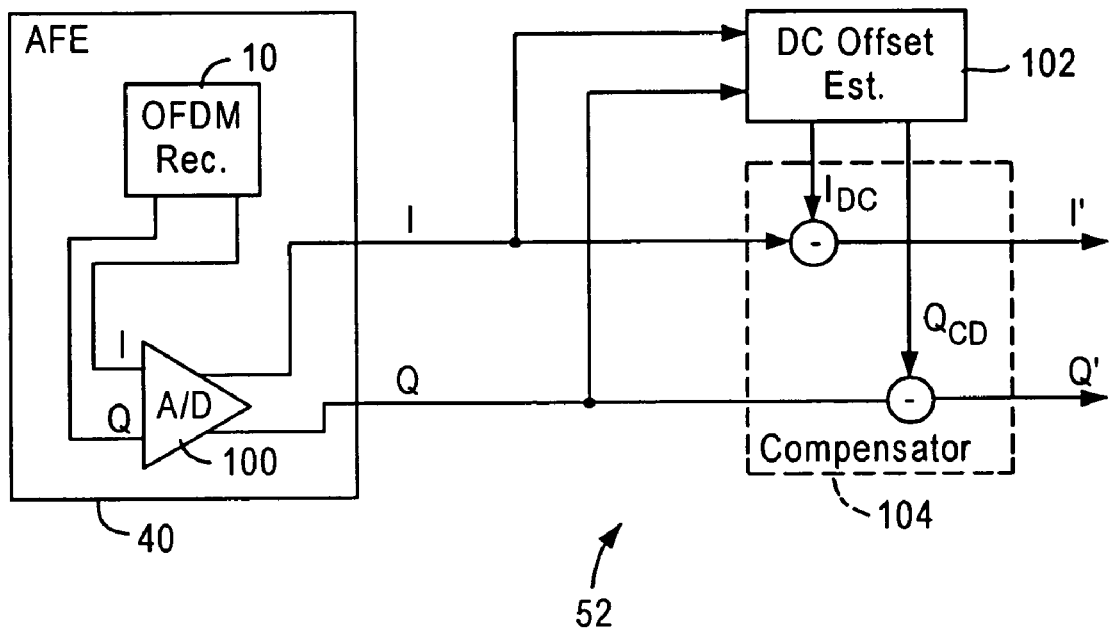
FIG. 3 is a block diagram illustrating in further detail the analog front end and I/Q compensation module of FIG. 2, according to an embodiment of the present invention.

FIG. 3 is a diagram illustrating in detail the analog front end and at least a portion of the I/Q compensation module 52, according to an embodiment of the present invention. As illustrated in FIG. 3, the analog front end 40 includes the OFDM receiver 10 of FIG. 1, and an analog to digital converter 100 that digitizes the I and Q components into I and Q digital signal samples.

The I/Q compensation module 52 includes a DC offset estimator 102 and a compensator 104. The DC offset estimator 102 is configured for determining DC offset components $I_{DC}$ and $Q_{DC}$ in the respective I and Q components output from the analog front end 40, enabling the compensator 104 to output corrected components I' and Q' having cancelled DC offset characteristics. Hence, the corrected components I' and Q' with minimal DC offset can be decoded with minimal intercarrier interference and fewer errors.

Figure 4:
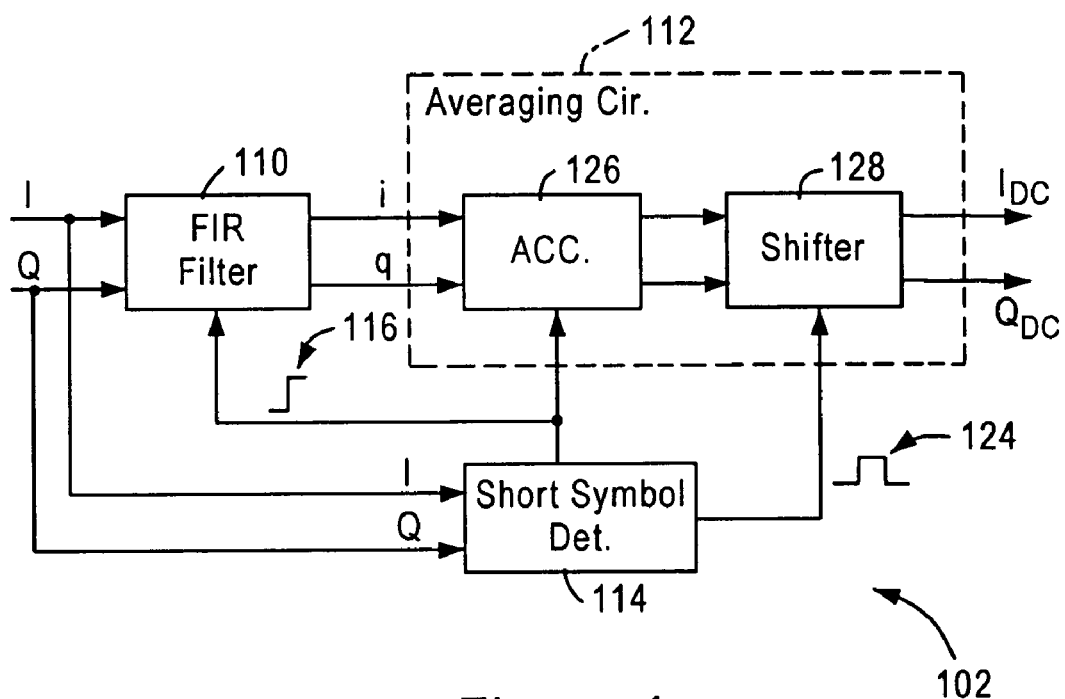
FIG. 4 is a diagram illustrating in detail the DC offset estimator of FIG. 3, according to an embodiment of the present invention.

FIG. 4 is a diagram illustrating in detail the DC offset estimator 102 according to an embodiment of the present invention. The DC offset estimator 102 includes a finite-impulse-response (FIR) filter 110, an averaging circuit 112, and a short training symbol detector 114.

Figure 5:
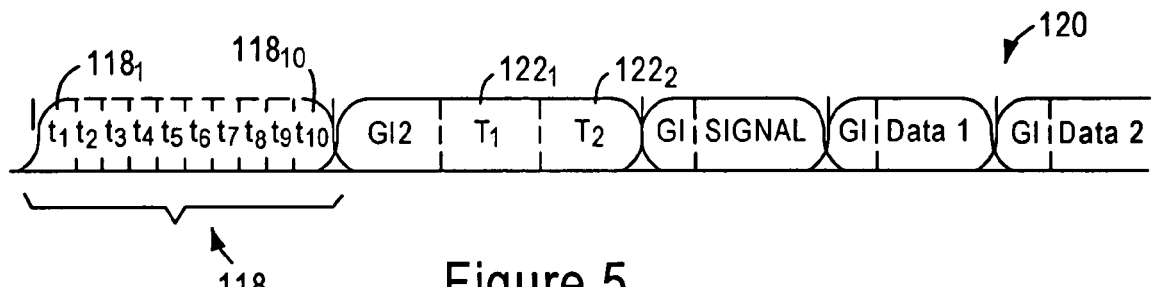
FIG. 5 is a diagram (PRIOR ART) illustrating a Physical Layer Convergence Procedure (PLCP) preamble of a received IEEE 802.11a packet.

The short training symbol detector 114 is configured for asserting a detection signal 116 in response to detecting short training symbols 118 of a PLCP preamble 120, illustrated in FIG. 5. In particular, the short training symbol detector 114 is configured for asserting the detection signal 116 in response to detecting the first short training symbol $118_1$, and maintaining assertion of the detection signal 116 until having detected the expiration of the last training short symbol $118_{10}$. As illustrated in FIG. 5, the short training symbols 118 are followed by a guard interval (GI2) and long training symbols $122_1$ and $122_2$. Hence, the short training symbol detector 114 asserts the detection signal 116 to ensure the FIR filter 110 filters only the I and Q signal samples associated with the short training symbols 118. As described below, the short training symbol detector 114 also is configured for generating an output strobe 124 in response to detecting a prescribed number of short training symbols 118; for example, upon having detected thirty-two (32) short training symbols 118 as the prescribed number, the detector 114 asserts the strobe 124, causing the averaging circuit 112 to output the determined DC offset components $I_{DC}$ and $Q_{DC}$.

The FIR filter 110 is configured for filtering prescribed subcarrier components from the I and Q components, represented by the I and Q digital signal samples, into filtered components "i" and "q" in response to the detection signal 116. Deassertion of the detection signal 116 disables outputs from the FIR filter 110. Hence, the FIR filter 110 outputs only "i" and "q" components where the prescribed subcarrier components have been filtered from the short training symbols 118.

The averaging circuit 112 includes an accumulator 126 and a shifter 128. The accumulator 126 is configured for accumulating the filtered samples "i" and "q" in response to assertion of the detection signal 116, and outputting the respective accumulator values to the shifter 128. The shifter 128 is configured for normalizing the accumulator values by digitally dividing the accumulator values using a shift operation. As described above, since the prescribed number of short training symbols to be evaluated is 32, the shifter 128 is configured for dividing by 32; the shifter 128 also is configured for outputting the respective determined DC offset components $I_{DC}$ and $Q_{DC}$ in response to the strobe 124.

In theory, the filtering of the prescribed 12 subcarrier components as specified by the IEEE 802.11a Standard should result in filtered components "i" and "q" which, when summed together and averaged over a prescribed number of samples by the averaging circuit 112, should result in the DC offset components $I_{DC}$ and $Q_{DC}$ having a value of zero. However, the presence of an induced DC component in the I and Q components generated by the receiver 10 causes the DC offset components $I_{DC}$ and $Q_{DC}$ to have a nonzero component.

Hence, the supply of the determined DC offset components $I_{DC}$ and $Q_{DC}$ enables the compensator 104 of FIG. 3 to digitally subtract the determined DC offset components from the I and Q components and output corrected I' and Q' components for decoding to recover the modulated data.

Figure 6:
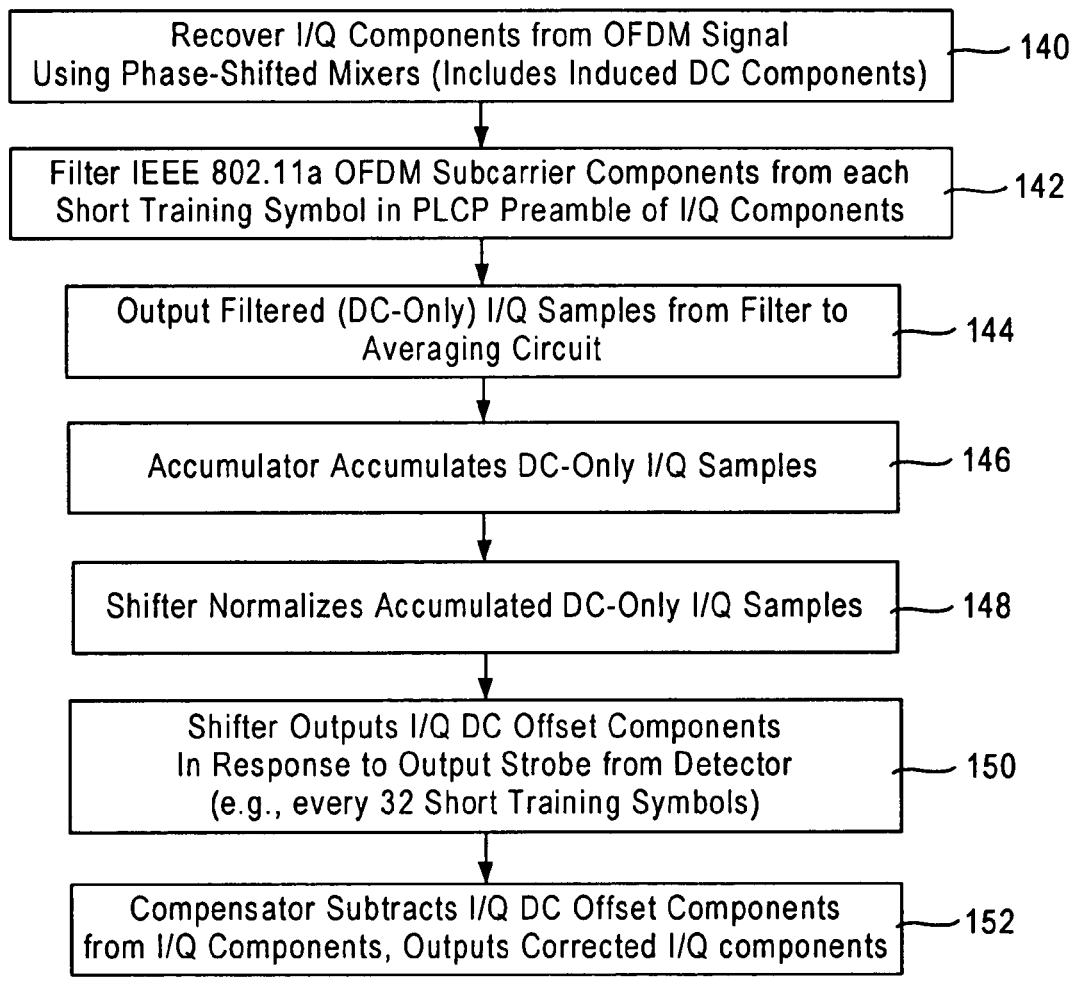
FIG. 6 is a diagram illustrating the method of performing DC offset cancellation by the receiver of FIGS. 2 and 3, according to an embodiment of the present invention.

FIG. 6 is a diagram illustrating the method of performing DC offset cancellation, according to an embodiment of the present invention. The analog front end 40 is configured for recovering in step 140 the I and Q components from the OFDM signal using its internal phase-shifted mixers 18a and 18b (see FIG. 1). As described above, the I and Q components include induced DC components.

The FIR filter 110 is configured for filtering in step 142 the OFDM subcarrier components from each short training symbol of each I and Q component in response to the detection signal 116. The FIR filter 110 outputs in step 144 the filtered (DC-only) I/Q samples "i" and "q" to the averaging circuit 112.

The accumulator 126 accumulates in step 146 the DC-only I and Q samples "i" and "q" during reception of the short training symbols (based on assertion of the detection signal 116), and outputs the accumulator values to the shifter 128. The shifter 128 normalizes in step 148 the accumulated samples, and outputs in step 150 determined DC offset components $I_{DC}$ and $Q_{DC}$ in response to the output strobe 124. The compensator 104 subtracts in step 152 the determined DC offset components $I_{DC}$ and $Q_{DC}$ from the original I and Q components, and outputs corrected components I' and Q' for decoding and data recovery.

According to the disclosed embodiment, prescribed subcarrier components are suppressed in order to determine DC offset. Hence, DC offset components can be removed from received I and Q components, minimizing intercarrier interference in the OFDM signal.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM direct conversion receiver configured for receiving a wireless signal carrying data, the method including:
    recovering first and second components from the wireless signal by mixing the wireless signal with first and second carrier frequency signals, respectively, the second carrier frequency signal phase-shifted by a prescribed amount relative to the first carrier frequency signal;
    determining first and second DC offset components based on filtering prescribed subcarrier components from a prescribed preamble portion of each of the first and second components, respectively; and
    outputting corrected first and second components of the wireless signal, for recovery of the data, based on removing the first and second DC offset components from the first and second components, respectively.

2. The method of claim 1, wherein the filtering includes:
    supplying the first and second components to a digital finite-impulse-response filter configured for filtering the prescribed subcarrier components and outputting filtered samples; and
    averaging the filtered samples associated with the prescribed preamble portion to obtain the first and second DC offset components.

3. The method of claim 2, wherein the averaging step includes accumulating the filtered samples from within the prescribed preamble portion, the prescribed preamble portion identified based on detecting a first and a last of a prescribed number of short training symbols in the data.

4. The method of claim 3, wherein the accumulating step includes detecting the short training symbols, including detecting the first and the last of the short training symbols, each of the short training symbols including the prescribed subcarrier components, the filtering including removing the prescribed subcarrier components from each short training sample for generation of the corresponding filtered sample.

5. The method of claim 4, wherein:
    the first and second components are I and Q components, respectively, the filtering including outputting the filtered samples in response to assertion of a signal representing the detection of the short training symbols;
    the averaging step further includes normalizing the accumulated filtered samples relative to a number of samples having been accumulated to obtain the first and second DC offset components.

6. The method of claim 1, wherein the removing includes digitally subtracting the first and second DC offset components from the first and second components, respectively.

7. An OFDM direct conversion receiver configured for receiving a wireless signal carrying data, the receiver including:
    an analog front end configured for recovering first and second components from the wireless signal by mixing the wireless signal with first and second carrier frequency signals, respectively, the second carrier frequency signal phase-shifted by a prescribed amount relative to the first carrier frequency signal;
    DC offset estimator configured for determining first and second DC offset components based on filtering prescribed subcarrier components from a prescribed preamble portion of each of the first and second components, respectively; and
    a compensator configured for outputting corrected first and second components of the wireless signal, for recovery of the data, based on removing the first and second DC offset components from the first and second components, respectively.

8. The receiver of claim 7, wherein the DC offset estimator includes:
    a digital finite-impulse-response filter configured for filtering the prescribed subcarrier components and outputting filtered samples, and
    an averaging circuit configured for averaging the filtered samples associated with the prescribed preamble portion to obtain the first and second DC offset components.

9. The receiver of claim 8, wherein the averaging circuit includes an accumulator configured for accumulating the filtered samples from within the prescribed preamble portion, the prescribed preamble portion identified based on detecting a first and a last of a prescribed number of short training symbols in the data.

10. The receiver of claim 9, wherein the DC offset estimator further includes a detector configured for asserting a detection signal in response to detecting the short training symbols, including the first and the last of the short training symbols, each of the short training symbols including the prescribed subcarrier components, the digital finite-impulse-response filter configured for removing the prescribed subcarrier components from each short training sample, in response to the detection signal, for generation of the corresponding filtered sample.

11. The receiver of claim 10, wherein:
    the first and second components are I and Q components, respectively;
    the averaging circuit including a shifter configured for normalizing the accumulated filtered samples relative to a number of samples having been accumulated to obtain the first and second DC offset components.

12. The receiver of claim 7, wherein the compensator is configured for removing the first and second DC offset components based on digitally subtracting the first and second DC offset components from the first and second components, respectively.

* * * * *